(12) United States Patent
Dai et al.

(10) Patent No.: US 8,943,092 B2
(45) Date of Patent: Jan. 27, 2015

(54) DIGITAL INK BASED CONTEXTUAL SEARCH

(71) Applicant: Microsoft Corporation, Redmond, WA (US)

(72) Inventors: Lynn Dai, Sammamish, WA (US); Daniel J. Hwang, Newcastle, WA (US); Zafeiria Anagnostopoulou, Bellevue, WA (US); Benjamin Westbrook, Redmond, WA (US); Peter Gregory Davis, Kirkland, WA (US); Sharath Viswanathan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 127 days.

(21) Appl. No.: 13/784,572

(22) Filed: Mar. 4, 2013

(65) Prior Publication Data
US 2014/0250143 A1 Sep. 4, 2014

(51) Int. Cl.
*G06F 17/30* (2006.01)
*G06F 3/0488* (2013.01)
*G06K 9/22* (2006.01)

(52) U.S. Cl.
CPC ........ *G06F 17/30477* (2013.01); *G06F 3/0488* (2013.01); *G06F 17/30864* (2013.01); *G06K 9/222* (2013.01); *G06F 3/04883* (2013.01)
USPC .......................................... 707/769; 382/113

(58) Field of Classification Search
USPC .......................................... 707/769; 382/113
See application file for complete search history.

(56) References Cited

U.S. PATENT DOCUMENTS

| | | |
|---|---|---|
| 2003/0215142 A1 | 11/2003 | Gounares et al. |
| 2004/0196306 A1* | 10/2004 | Manto et al. ................... 345/700 |
| 2005/0182760 A1* | 8/2005 | Lee et al. ........................... 707/3 |
| 2005/0222848 A1 | 10/2005 | Napper et al. |
| 2008/0104020 A1* | 5/2008 | Kato .................................. 707/3 |
| 2008/0250012 A1* | 10/2008 | Hinckley et al. .................. 707/5 |
| 2009/0002392 A1* | 1/2009 | Hou et al. ...................... 345/619 |
| 2009/0003658 A1* | 1/2009 | Zhang et al. ................... 382/113 |
| 2009/0052777 A1* | 2/2009 | Yu et al. ......................... 382/187 |
| 2009/0058820 A1 | 3/2009 | Hinckley |
| 2010/0105370 A1 | 4/2010 | Kruzeniski et al. |
| 2010/0162182 A1* | 6/2010 | Oh et al. ........................ 715/863 |
| 2010/0169841 A1* | 7/2010 | Singh ............................. 715/863 |
| 2011/0225547 A1* | 9/2011 | Fong et al. ..................... 715/835 |
| 2011/0295877 A1* | 12/2011 | Ying et al. ..................... 707/769 |
| 2011/0302522 A1* | 12/2011 | Cao et al. ....................... 715/780 |
| 2011/0307505 A1* | 12/2011 | Ito .................................. 707/769 |
| 2012/0260202 A1* | 10/2012 | Jiang et al. ..................... 715/765 |
| 2013/0103712 A1* | 4/2013 | Li et al. ......................... 707/769 |

(Continued)

OTHER PUBLICATIONS

Article entitled "Google Introduces "Handwrite" for Mobile Searches", by Kellex, dated Jul. 26, 2012.*

(Continued)

*Primary Examiner* — Mahesh Dwivedi
(74) *Attorney, Agent, or Firm* — Timothy Churna; Kate Drakos; Micky Minhas

(57) ABSTRACT

Disclosed herein are representative embodiments of tools and techniques for performing contextual searches using text determined based on digital-ink data. According to one exemplary technique, digital-ink data is received at a computing device and text is determined based on the digital-ink data. Additionally, by an application of the computing device, a contextual search is performed using the text.

12 Claims, 11 Drawing Sheets

(56) References Cited

U.S. PATENT DOCUMENTS

| | | | | |
|---|---|---|---|---|
| 2013/0263251 A1* | 10/2013 | Fleizach et al. | ............... | 726/19 |
| 2013/0321314 A1* | 12/2013 | Oh et al. | ..................... | 345/173 |
| 2014/0019905 A1* | 1/2014 | Kim et al. | .................... | 715/780 |
| 2014/0038557 A1* | 2/2014 | Kim et al. | .................... | 455/411 |
| 2014/0165012 A1* | 6/2014 | Shen et al. | ................... | 715/863 |

OTHER PUBLICATIONS

Article entitled "Google Handwrite Lets You Scribble Searches With Your Finger", by Moscaritolo, dated Jul. 26, 2012.*

Article entitled "Make your mark on Google with Handwrite for Mobile and Tablet Search", by Ueyama, dated Jul. 26, 2012.*

WO 2014/089669 by Yu et al., dated Jun. 19, 2014.*

"Ink Recognition (Windows)," Retrieved on: Jan. 14, 2012, 3 pages, Available at: http://msdn.microsoft.com/en-us/library/windows/desktop/ms699561(v=vs.85).aspx.

Egger, "Ink Recognition and Ink Analysis," Retrieved on: Jan. 14, 2012, 11 pages, Available at: http://www.markusegger.com/articles/Article.aspx?quickid=0512042.

Kraft et al., Yahoo!, "Searching with Context," *In 15th International Conference on World Wide Web*, May 23, 2006, 31 pages.

Lu et al., "Contextual Image Search," *In ACM Multimedia*, Nov. 28, 2011, 10 pages.

Minkov et al., "Contextual Search and Name Disambiguation in Email Using Graphs," *In 29th Annual International SIGIR Conference*, Aug. 6, 2006, 8 pages.

Hinckley et al., "InkSeine: InSitu Search for Active Note Taking," *Proceedings of the SIGCHI Conference on Human Factors in Computing Systems*, Apr.-May 2007, pp. 251-260.

International Search Report and Written Opinion for PCT/US2014/017722, dated Apr. 29, 2014, 12 pages.

* cited by examiner

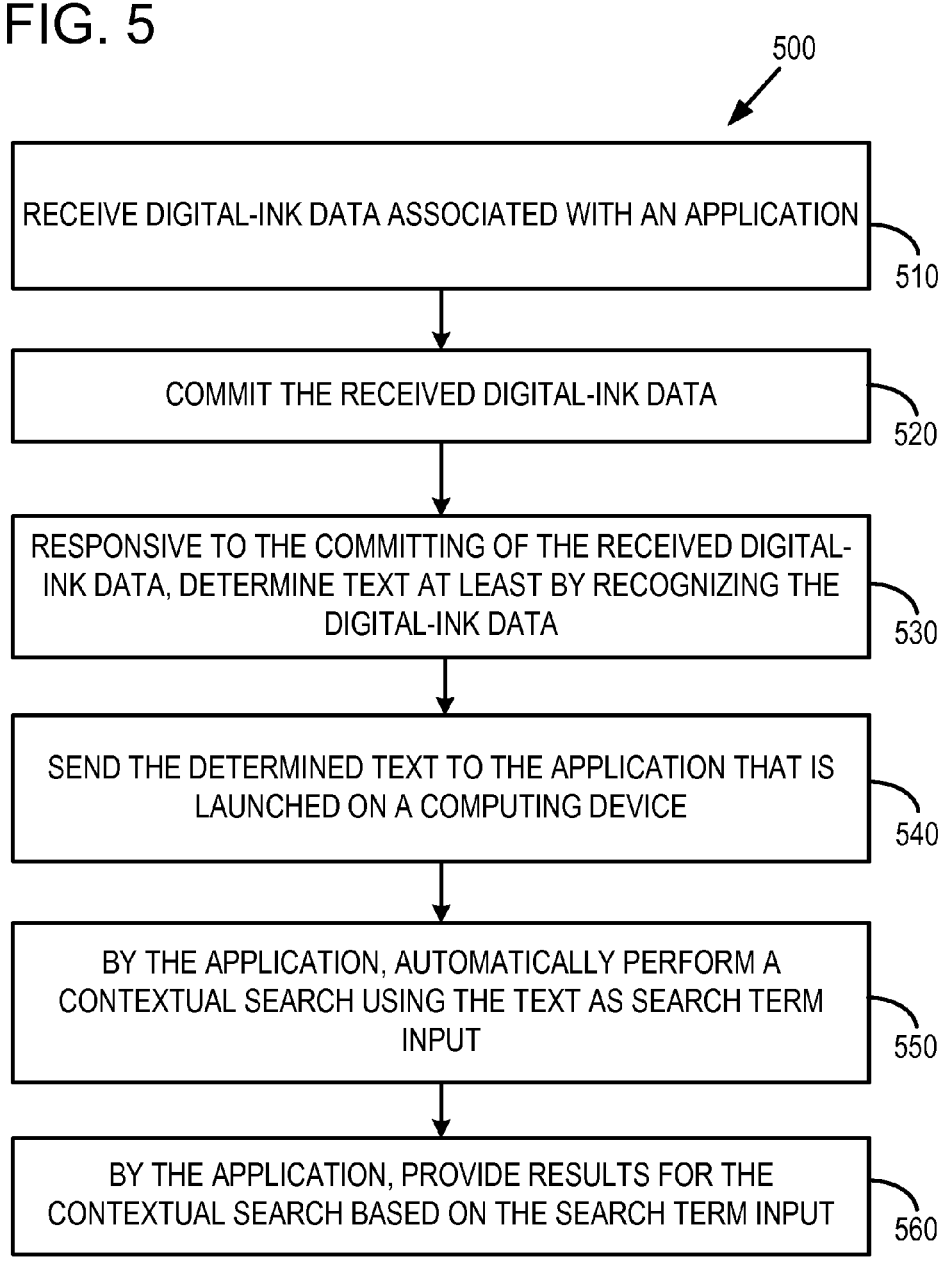

DIGITAL INK BASED CONTEXTUAL SEARCH

BACKGROUND

Mobile devices with capacitive or resistive touch capabilities are well known. Mobile phones have evolved over recent years to the point where they possess a broad range of capabilities. They are not only capable of placing and receiving mobile phone calls, multimedia messaging (MMS), and sending and receiving email, they can also access the Internet, are GPS-enabled, possess considerable processing power and large amounts of memory, and are equipped with high-resolution displays capable of detecting touch input. As such, today's mobile phones are general purpose computing and telecommunication devices capable of running a multitude of applications. For example, modern mobile phones can run word processing, web browser, media player and gaming applications.

As mobile phones have evolved to provide more capabilities, various user interfaces have been developed for users to enter information. In the past, some traditional input technologies have been provided for inputting text, however, these traditional text input technologies are limited.

SUMMARY

Among other innovations described herein, this disclosure presents various representative embodiments of tools and techniques for contextual searching using text determined from digital-ink data.

In one embodiment, digital-ink data is received at a computing device, and text is determined based on the digital-ink data. Additionally, by an application of the computing device, a contextual search is performed using the text.

According to another exemplary technique, digital-ink data is received and text is determined based on the digital-ink data. Also, the text is sent to an application. Additionally, by the application, a contextual search is performed using the text.

In another exemplary technique, digital-ink data is received that is associated with an application, and the received digital-ink data is committed. Responsive to the committing the received digital-ink data, text is determined at least by recognizing the digital-ink data. Also, the determined text is sent to the application that is launched on a computing device. Additionally, by the application, a contextual search is performed using the text as search term input. Also, by the application, results are provided for the contextual search based on the search term input.

This summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 5 is a flow diagram illustrating an exemplary method for providing results for a contextual search based on digital-ink data.

DETAILED DESCRIPTION

This disclosure presents various representative embodiments of tools and techniques for performing contextual searches using text determined from digital-ink data. The digital-ink data can be generated to produce writing in digital ink displayed in a touchscreen of a computing device. The contextual searches can be performed using determined text as search term input. For example, a user can write in the touchscreen in digital ink by contacting the touchscreen to produce digital-ink data that can be used to display the digital ink in the touchscreen. The writing in digital ink can be converted into text using the digital-ink data and the text can be used by an application to perform a contextual search.

Figure 1:
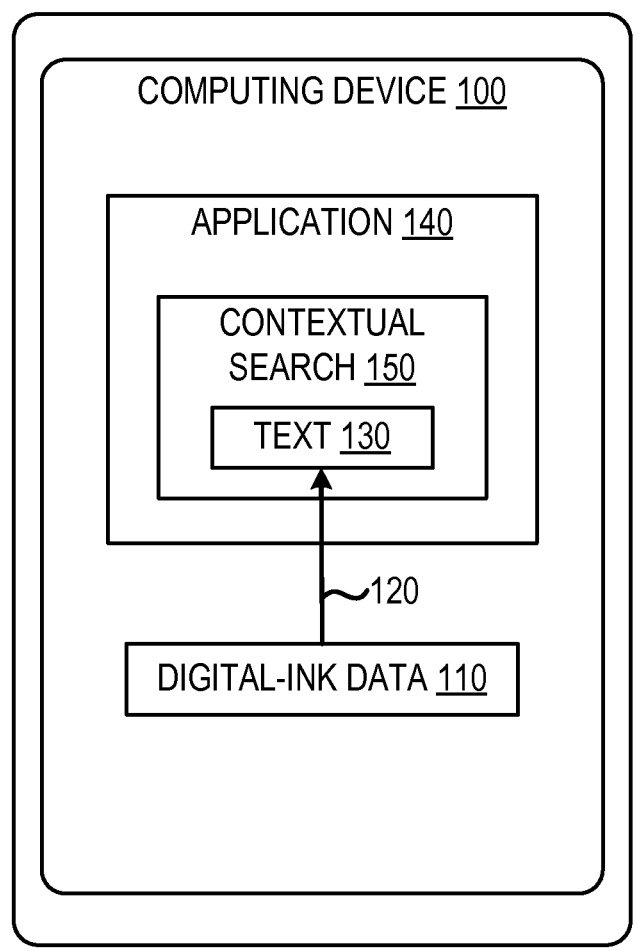
FIG. 1 is a diagram illustrating an exemplary computing device that can perform a contextual search based on digital-ink data.

Exemplary System for Performing a Contextual Search Based on Digital-Ink Data FIG. 1 is a diagram illustrating an exemplary computing device 100 that can perform a contextual search 150. In FIG. 1, digital-ink data 110 is received at the computing device 100. For example, a user of the computing device 100 writes in a touchscreen of the computing device using digital ink displayed from digital-ink data 110 received from the user contacting the computing device 100 according to the displayed writing. At 120, text 130 is determined based on the digital-ink data 110. For example, the writing in digital ink is converted to the text 130 using the received digital-ink data 110. After the text 130 is determined, the text 130 is used by an application 140 to perform a contextual search 150.

Figure 2:
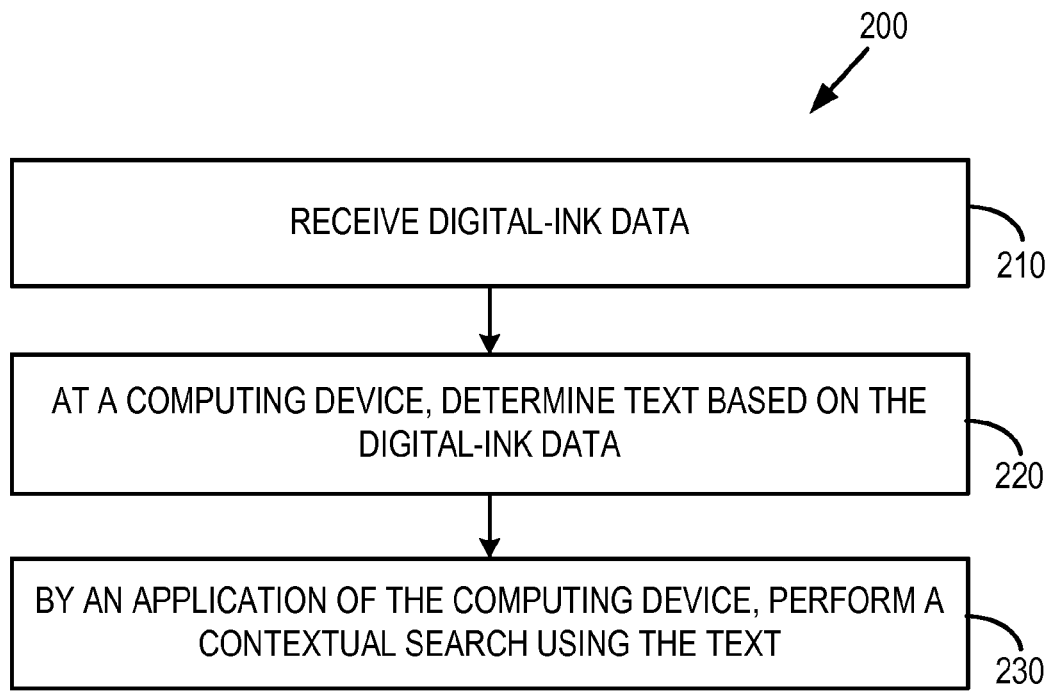
FIG. 2 is a flow diagram illustrating an exemplary method for performing a contextual search based on digital-ink data.

Exemplary Method for Performing a Contextual Search Based on Digital-Ink Data FIG. 2 is a flow diagram illustrating an exemplary method 200 for performing a contextual search based on digital-ink data. In FIG. 2, digital-ink data is received at a computing device at 210. For example, contact with a touchscreen of the computing device can be detected at one or more locations of the touchscreen to produce digital-ink data. In one example, a user can freehand write words on the touchscreen to produce the digital-ink data. Responsive to detecting the contact with the touchscreen, digital ink based on the digital-ink data can be rendered and/or displayed at the one or more locations of the touchscreen corresponding to the one or more locations of contact with the touchscreen. In some implementations, the rendered and/or displayed digital ink can form and/or include writing. For example, a user of the computing device can contact the touchscreen to produce writing displayed in the touchscreen as the digital ink. The contact with the touchscreen to write using digital ink can be performed using an object such as a finger, a key, a pen, a stylus, or the like.

In some implementations, the digital-ink data can be received at a platform level of the computing device. For example, one or more components of an operating system for the computing device can receive the digital-ink data based on input from the touchscreen. In an exemplary implementation, the operating system of the computing device can include one or more components for digital ink rendering and analysis. In some implementations, the operating system can monitor for and/or receive the digital-ink data until the digital-ink data is committed for a contextual search. In some implementations, the received digital-ink data can be associated with an application at an application level. For example, the digital-ink data can be associated with a launched application that displays content that is overlapped by the rendered and/or displayed digital ink. In another example, when an icon for an application is written on before the application is launched, the digital-ink data can be associated with the application. The digital ink overlapping the application content or an icon for the application can obstruct at least a portion of the displayed image of the application content or the icon for the application. For example, the digital ink rendered in the touchscreen display when the digital-ink data is received can be rendered and/or displayed at least in part overlapping at least a portion of an icon for launching the application in an operating system interface screen.

In some implementations, a launched application can include functionality to activate digital-ink recognition and the functionality can be used to activate and/or prompt the operating system to monitor and/or receive the digital-ink data based on touchscreen input so that the application can perform a contextual search based on the digital-ink data. For example, the functionality to activate the digital-ink recognition can include activating the digital-ink recognition using a gesture on the touch screen, selecting a displayed button, a key or button press, or other like user interface tool.

At 220, text is determined based on the digital-ink data. For example, after the digital-ink data is received, the digital-ink data can be recognized and/or translated into text. In some implementations, the writing of the digital-ink data can be converted from a digital-ink format to text in a text format using one or more recognition techniques such as digital-ink recognition or the like. For example, the digital-ink data writing can be translated into text using a digital-ink recognition engine. In some implementations, the writing of the digital-ink data can be written in a handwriting or other like style that can be translated into text. In some implementations, the determined text can be data in a text format such as one or more characters encoded in a digital format that can be interpreted at least by one or more applications. In some implementations, the text and/or a portion of the determined text is display or is not displayed in the touchscreen display. For example, before or after a contextual search is performed using the text, the text and/or a portion of the text is or is not rendered and/or displayed in the touchscreen display. In some implementations, the text is determined but not rendered in the touchscreen for display; however the data can be stored and/or accessible for use by the computing device and its components such as by one or more operating environments and or one or more applications. In some implementations, the text can include one or more letters, numbers, characters, words, phrases, sentences or combinations thereof.

At 230, a contextual search is performed by an application of the computing device using the text. For example, a launched application executing on the computing device can use the determined text to run a search using a search functionality of the application. In some implementations, the application can include one or more search functionalities and the text can be used to perform at least one search using at least one of the one or more search functionalities of the application. For example, the application can include a text search, a maps search, a search engine, a contacts search, an information filter, or other search functionality. In some implementations, as part of the contextual search, the application includes an edit field for search term input and the text can be displayed in the edit field. In other implementations, the application performs the contextual search without including the text in an edit field for search term input.

Figure 3:
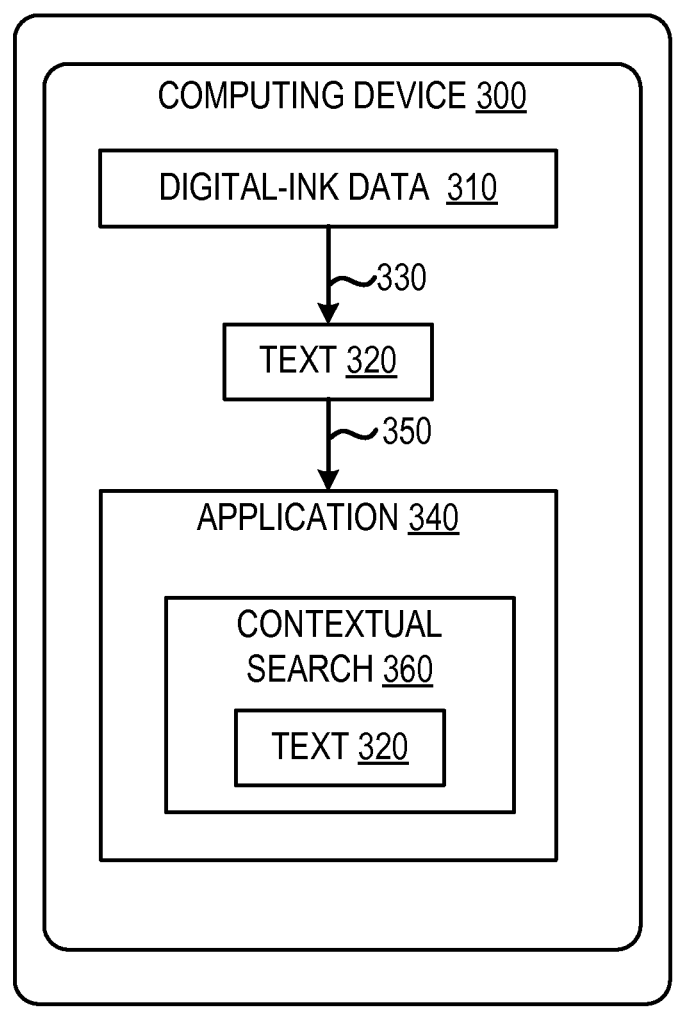
FIG. 3 is a diagram illustrating an exemplary computing device that can send text determined from digital-ink data to an application to perform a contextual search.

Exemplary System for Sending Text Determined from Digital-Ink Data to an Application to Perform a Contextual Search FIG. 3 is a diagram illustrating an exemplary computing device 300 that can send text 320 determined from digital-ink data 310 to an application 340 to perform a contextual search 360. In FIG. 3, digital-ink data 310 is received at the computing device 300. At 330, text 320 is determined based on the digital-ink data 310. After the text 320 is determined at 330, the text 320 is sent to the application 340 as shown at 350. The text 320 is received by the application 340 and used to perform a contextual search 360.

Figure 4:
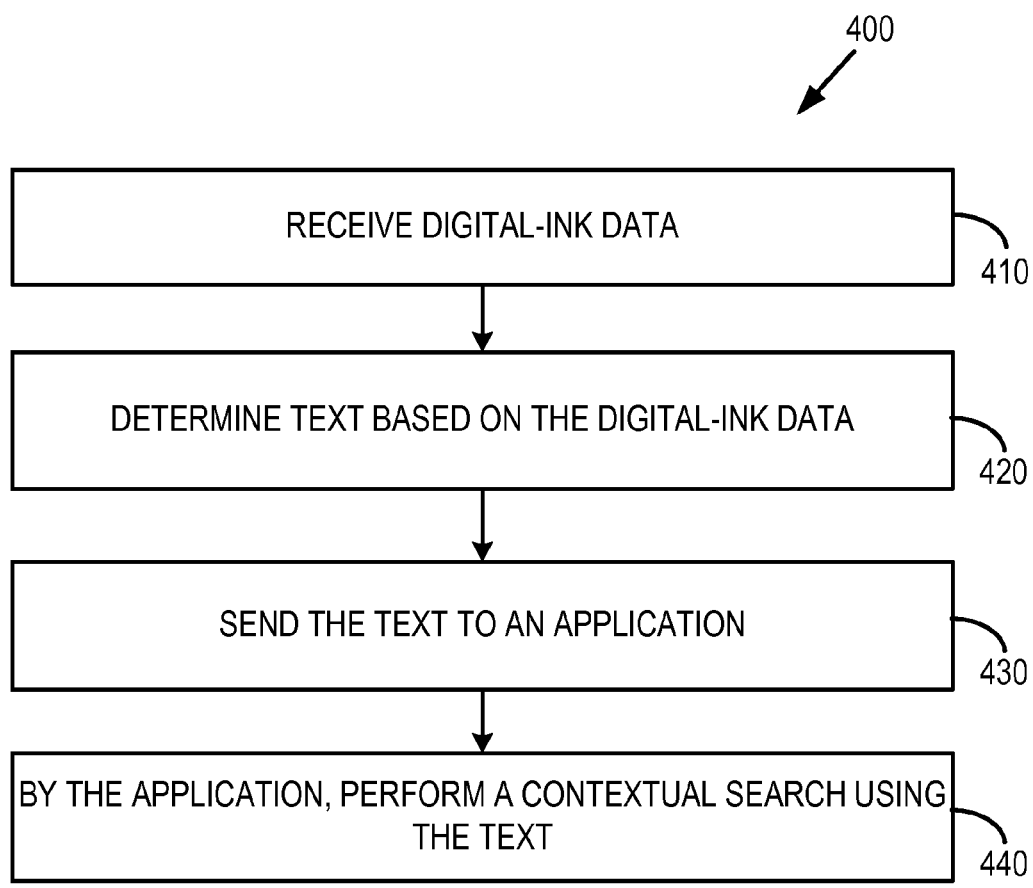
FIG. 4 is a flow diagram illustrating an exemplary method for sending text determined from digital-ink data to an application for performing a contextual search.

Exemplary Method for Sending Text Determined from Digital-Ink Data to an Application to Perform a Contextual Search FIG. 4 is a flow diagram illustrating an exemplary method 400 for sending text determined from digital-ink data to an application for performing a contextual search. In FIG. 4, digital-ink data is received at a computing device at 410. For example, contact with a touchscreen of the computing device can be detected at one or more locations of the touchscreen. Responsive to detecting the contact with the touchscreen, digital ink can be rendered at the one or more locations of the touchscreen corresponding to the one or more locations of contact with the touchscreen. In some implementations, the rendered digital ink in the touchscreen can include writing. For example, a user can contact the touchscreen to write information in the touchscreen in digital ink. In some implementations, the writing in digital ink can include one or more letters, numbers, characters, words, phrases, sentences or combinations thereof.

At 420, text is determined based on the digital-ink data. For example, after the digital-ink data is received, the digital-ink data can be recognized and/or translated into text. The determined text can correspond to the writing in digital ink based on the digital-ink data. For example, the determined text can include at least one or more letters, numbers, characters, words, phrases, or sentences that are written in the display in digital ink. In some implementations, the text can be determined by a component of platform such as an operating system.

At 430, the text is sent to an application. For example, an operating system can send the text to an application associated with the received digital-ink data. In some implementations, the application can have the ability to receive text from the operating system. For example, the text can be sent to an application using an application programming interface (API) or other like manner of transferring data to an application.

In some implementations, the text can be sent to the application that is launched when the digital-ink data is received. In some implementations, the digital-ink data can be associated with a launched application such that the digital ink displayed from the received digital-ink data is rendered and/or displayed overlapping displayed and/or rendered content of the application in the touchscreen. In some implementations, application content can include information rendered and/or displayed in the touch screen for the application such as text, graphics, characters, images, and the like.

In some implementations, the text can be sent to an application associated with the digital-ink data that is launched after the digital-ink data is received. For example, the digital-ink data can be associated with the application such that at least a portion of the digital ink rendered and/or displayed can overlap at least a portion of an icon for the application displayed in the touchscreen that can be used to launch the application. In some implementations, the icon can be an application dynamic icon such that the icon for the application can be dynamic. In some implementations, the icon for the application can be associated with a boundary within the touchscreen. For example, the boundary associated with the icon can be a displayed border of the icon or a boundary associated with the location and/or properties of the application icon in the touchscreen. In some implementations, the boundary can be smaller, larger or the same size as the displayed border of the displayed icon. In some implementations, the boundary can be located in the touch screen relative to the application icon. For example, at least a portion of the displayed icon and at least a portion of the area bounded by the boundary can overlap. The boundary of the icon can be determined at a platform level such as by an operating system of the computing device that displays the icon. In some implementations, the portion of the digital ink writing displayed within the boundary of the icon is recognized and used for the search.

In some implementations, after the digital-ink data is received the application can be launched to execute on the computing device and the text can be sent to the application. The text can be determined from the digital-ink data at least one of before, during, or after the application is launched.

At 440, a contextual search is performed by the application using the text. For example, a launched application executing on the computing device can use the determined text to run a search using at least one search functionality of the application. In some implementations, the application can perform the contextual search automatically or otherwise. For example, the contextual search can be performed by the application using the text responsive to receiving the text at the application. In another exemplary implementation, the application can input, store, access, or otherwise use the text to perform a search using at least one search functionality of the application. For example, the application can input the received text into a data field for receiving search term input for conducting a search using the search functionality of the application. In some implementations, the search can be activated and/or performed after receiving the text at the application using a user interface search feature of the application. In some implementations, the application determines how the text is used to perform the contextual search. For example, an application can use the text according to the functionality of the application.

Exemplary Method for Providing Results for a Contextual Search Based on Digital-Ink Data FIG. 5 is a flow diagram illustrating an exemplary method for providing results for a contextual search based on digital-ink data. In FIG. 5, digital-ink data is received at 510, and the digital-ink data is associated with the digital-ink data. For example, contact with a touchscreen of the computing device can be detected at one or more locations of the touchscreen to produce digital-ink data. Responsive to detecting the contact with the touchscreen, digital ink based on the digital-ink data can be rendered and/or displayed at the one or more locations of the touchscreen corresponding to the one or more locations of contact with the touchscreen. For example, the receiving the digital-ink data can include rendering digital ink to produce displayed writing in the touchscreen. The rendered and/or displayed digital ink can include writing in one or more languages.

At 520, the received digital-ink data is committed. For example, when the writing in the digital ink based on the digital-ink data is completed, the received digital-ink data can be committed to signal the operating system that the digital-ink data is complete and can be used in determining text for performing a contextual search. In some implementations, the operating system continues to monitor for and/or receives digital-ink data until the digital-ink data is committed. In some implementations, the committing of the digital-ink data includes the operating system of the computing device determining that a committing functionality of the operating system has been activated. For example, the commit functionality can be activated using a gesture on the touch screen, selecting a displayed button, a key or button press, other like user interface tool that can be used to activate the committing functionality of the digital-ink data. In some implementations, when the digital-ink data is received such that the corresponding digital ink is rendered overlapping an icon for an application, the digital-ink data can be committed by launching the application. In some implementations, after the digital-ink data is received the digital-ink data is committed automatically. For example, writing with digital ink on an icon for the application can commit the corresponding digital-ink data for performing a contextual search by the application.

At 530, responsive to the committing of the received digital-ink data, text is determined at least by recognizing the digital-ink data. For example, after the digital-ink data is received, the digital-ink data can be recognized and/or translated into text.

At 540, the determined text is sent to an application that is launched on the computing device. For example, the determined text can be sent to and received by an application that is launched on the computing device. In some implementations, the determined text can be sent to the application using an API. The application that receives the text can be associated with the digital-ink data used to determine the text. In some implementations, the application that receives the sent text can be launched before or after the text is determined from the digital-ink data. In an exemplary implementation, after the digital-ink data is committed, the application can be launched and then the determined text can be sent to the launched application. The text can be sent to the application such that it can be used in a contextual search by the application.

At 550, a contextual search is automatically performed by the application using the text as search term input. For example, the application executing on the computing device can use the text to automatically run a search in the context of the application using a search functionality of the application. In some implementations, the search is done on the terms or the text. For example, the text can be input as search terms into the search functionality of the launched application for conducting the search. In some implementations, the application can search one or more databases and/or sets of data using the search functionality.

At 560, results for the contextual search are provided by the application based on the search term input. For example, results can be displayed and/or rendered in the touchscreen that are determined from the search by the application's search functionality that was performed based on the determined text. In some implementations, the search results can be provided as content of the application. For example, the determined search results can be displayed and/or rendered in a screen and/or user interface of the application that performed the search using the determined text. In some implementations, the application can provide the search results as determined by the application. For example, applications can include one or more of various search functionalities and the results determined by the search functionalities can be provided according to the application.

Figure 6A:
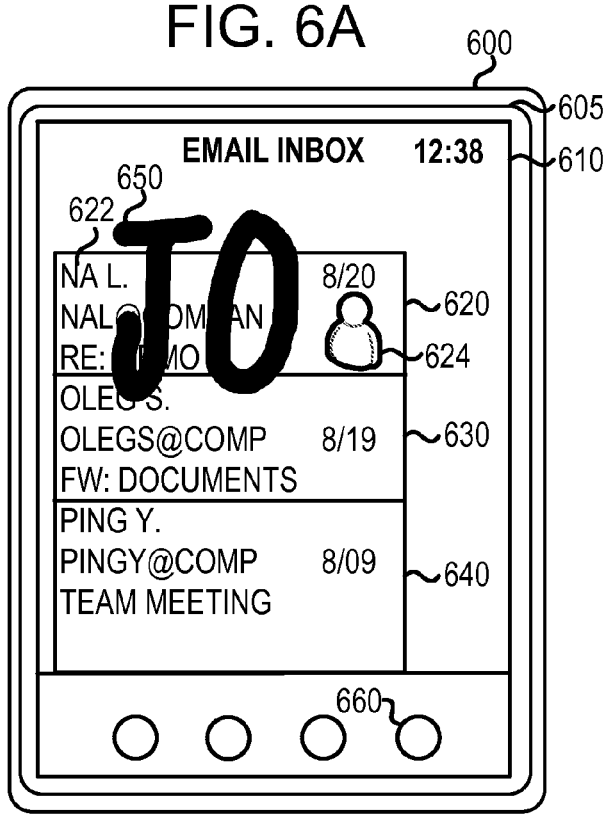
FIGS. 6A-B illustrate an exemplary computing device with a touchscreen displaying a user interface of a launched email application that can perform a contextual search based on text determined from digital-ink data.

Exemplary Contextual Search Performed by an Email Application based on Text Determined from Digital-Ink Data FIG. 6A is a diagram illustrating an exemplary computing device 600 with a touchscreen 605 displaying a user interface of a launched application 610 that can perform a contextual search based on text determined from digital-ink data. In FIG. 6A, the application 610 is an email application. The application 610 provides and/or displays content appropriate for an email application such as content 620, 630 and 640. The content 620 includes information such as text 622 and graphical information such as a picture 624. Digital ink 650 is generated and/or written in the touchscreen 605 based upon digital-ink data generated from detected user input such as detected contact with the touchscreen 605. The operating system of computing device 600 receives the digital-ink data that includes the digital ink 650. The digital ink 650 is writing indicating the letters "JO" in a non-text format in the touchscreen 605. The digital ink 650 is displayed in the touchscreen 605 overlapping content of the launched application 610. The digital ink 650 is rendered and displayed overlapping content 620 and content 630 of the application 610 displayed in the touchscreen 605. The displayed digital ink 650 is rendered and/or displayed based on digital-ink data received by the operating system of the computing device 600.

The digital ink 650 and its corresponding digital-ink data are associated with the executing application 610. The digital-ink data is associated with the launched application 610 such that the digital-ink data is received and the digital ink 650 is written in the touchscreen 605 while the launched application 610 is the active application executing on the computing device 600. In some implementations, the digital-ink data can be associated with the launched application such that digital ink corresponding to the digital-ink data is displayed overlapping the content of the launched and executing application. After the writing in digital ink is completed, the corresponding received digital-ink data is committed by activating the committing functionality 660. The digital-ink data is committed to be translated into text. The text is sent to application 610 to be used for a contextual search by the operating system executing on the computing device 600.

Figure 6B:
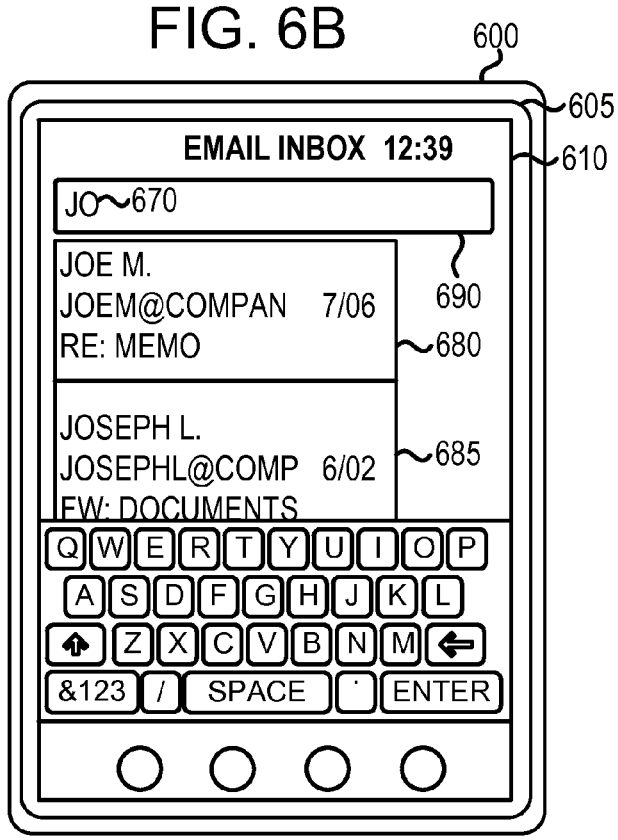

FIG. 6B is a diagram illustrating the exemplary computing device 600 with the touchscreen 605 displaying a user interface of the launched application 610 that can perform a contextual search based on text determined from digital-ink data. In FIG. 6B the text 670 displayed by application 610 in touchscreen 605 is determined from the digital ink 650 as shown in FIG. 6A. The text 670 includes the letters "JO" in a text format and is displayed in a search term input field 690 in the touchscreen 605. The application 610 performs a contextual search using an email search functionality of the application 610 based on the text 670 determined from the digital ink 650 as shown in FIG. 6A. The contextual search produces search results such as displayed search result 680 and search result 685. The search results include a list of received emails from the email inbox that are associated with and/or include the text 670 in one or more fields or content, such as the search result 680 that includes information about an email with the name "JOE M." The name "JOE M." includes the letters "JO" and the name is included in the sender name field associated with the email. After the text 670 is determined from the digital ink 650 of FIG. 6A, the text 670 is sent from the operating system of computing device 600 to the application 610 by an API to automatically perform the contextual search that generated the search results 680 and 685. The contextual search performed by application 610 included the text 670 as search term input in the search term input field 690 of a search functionality of application 610. The contextual search performed by the application 610 filtered the emails of the application 610 based on the text 670.

Figure 7A:
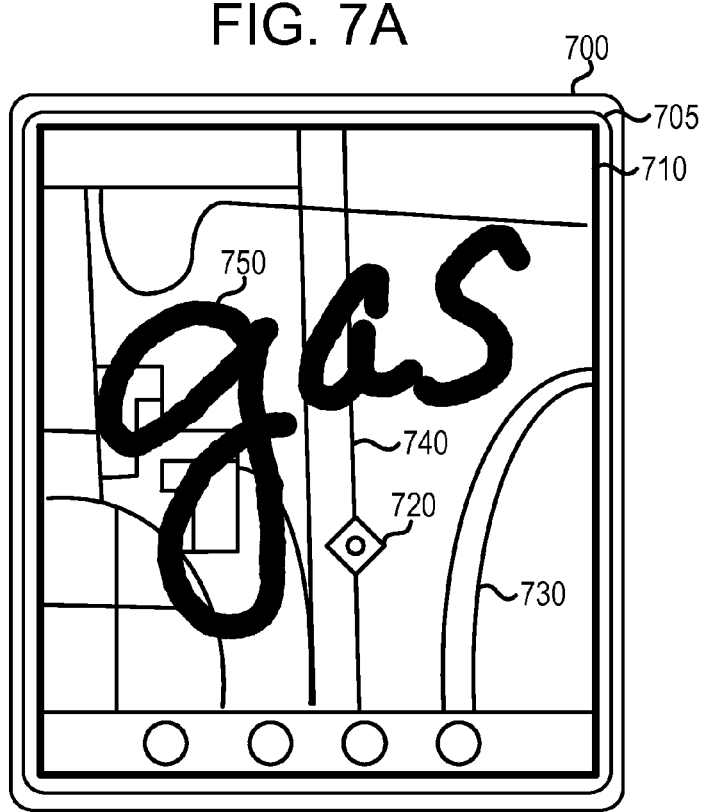
FIGS. 7A-B illustrate an exemplary computing device with a touchscreen displaying a user interface of a launched mapping application that can perform a contextual search based on text determined from digital-ink data.

Exemplary Contextual Search Performed by a Mapping Application based on Text Determined from Digital-Ink Data FIG. 7A is a diagram illustrating an exemplary computing device 700 with a touchscreen 705 displaying a user interface of a launched application 710 that can perform a contextual search based on text determined from digital-ink data. In FIG. 7A, the application 710 is a mapping application. The application 710 includes a search functionality that can take input search terms and indicate locations on one or more maps based on the search terms. In some implementations, the search terms can be associated with the indicated locations by the application. The application 710 provides and/or displays content such as map content 720, 730 and 740. The map content 720 includes an indication of a location of the mobile device 700 on a map provided by application 710. The map content 730 and the map content 740 include elements of the map displayed by application 710. Digital ink 750 is generated and/or written in the touchscreen 705 based on user input such as through detected user contact with the touchscreen 705 in a motion that writes the word "gas" in the touchscreen 705.

The operating system of computing device 700 receives the digital-ink data used to produce the displayed digital ink 750. The digital ink 750 is writing that includes the word "gas" in a non-text format in the touchscreen 705. The digital ink 750 is rendered and/or displayed in the touchscreen 705 overlapping content of the application 710 such as map content 740 displayed in the touchscreen 705. The displayed digital ink 750 is rendered based on digital-ink data received by the operating system of the computing device 700.

The digital-ink data that is used to render the digital ink 750 is associated with the executing application 710. The digital-ink data is associated with the launched application 710 as the digital-ink data is received to produce the digital ink 750 while the launched application 710 is the active application executing on the computing device 700. The received digital-ink data producing the digital ink 750 is used to determine text that is sent from the operating system of the computing device 700 to application 710 for use in a contextual search.

Figure 7B:
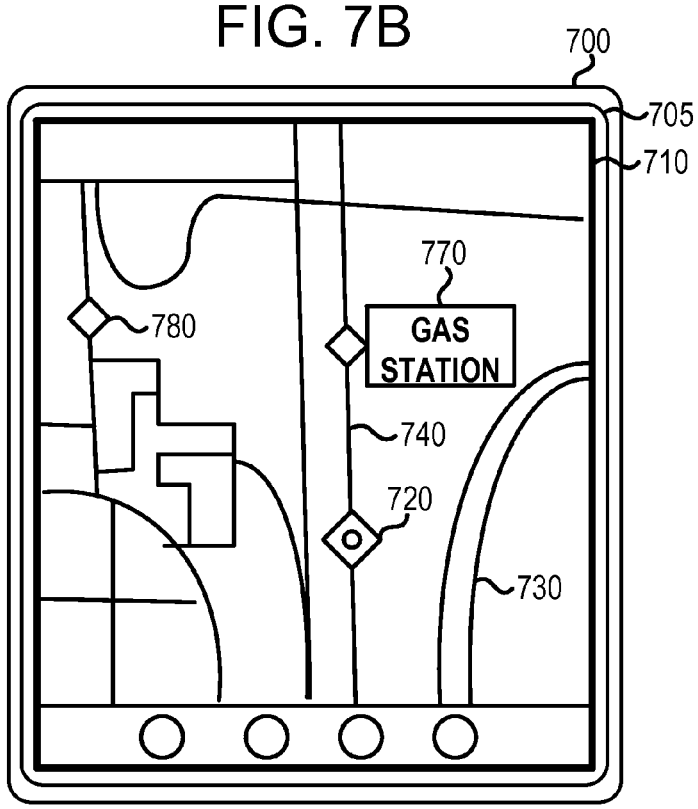

FIG. 7B is a diagram illustrating the exemplary computing device 700 with the touchscreen 705 displaying a user interface of the launched application 710 that can perform a contextual search based on text determined from digital-ink data. In FIG. 7B, search results such as search result 770 and search result 780 are displayed by the application 710 based on a contextual search performed using the text determined from the digital ink 750 as shown in FIG. 7A. The determined text includes the word "gas" in a text format that corresponds to the word written by the digital ink 750 as shown in FIG. 7A. The search result 770 includes an indicator of a location of a gas station in the map provided by application 710. To produce the search result 770, the application 710 performed a contextual search using a map search functionality of the application 710 based on the text determined from the digital ink 750 as shown in FIG. 7A. The text that includes the word "gas" is the search term input for the search that produced the search results shown in FIG. 7B. The search result 770 and search result 780 include indications of locations on the map corresponding to places where gas stations are located. After the digital ink 750 of FIG. 7A is recognized to determine text, the determined text is sent from the operating system of computing device 700 to the application 710 by an API to automatically perform the contextual search that generates the search results shown in FIG. 7B.

Figure 8A:
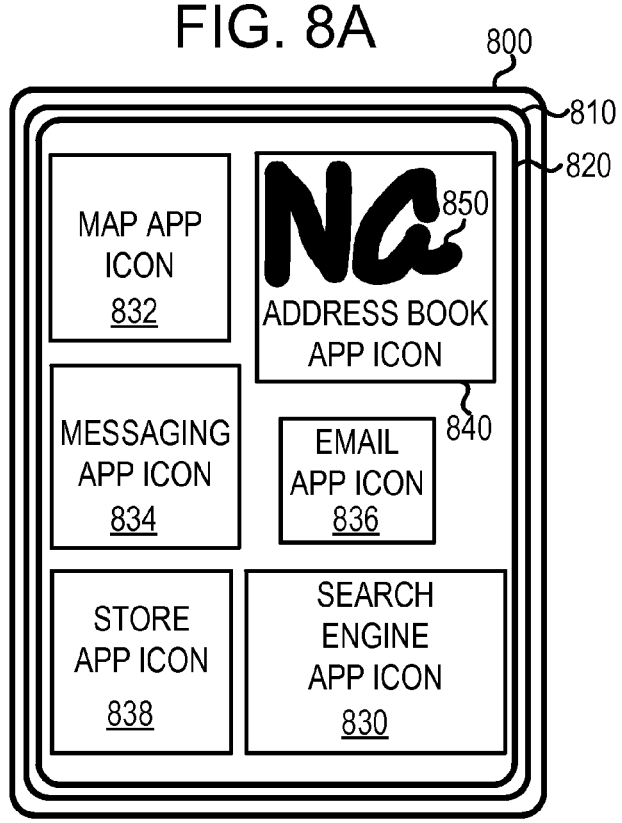
FIG. 8A is a diagram illustrating an exemplary computing device displaying icons for applications that can perform contextual searching based on digital-ink data.

Exemplary Contextual Search Performed by an Application based on Received Digital-Ink Data Associated with an Icon for the Application FIG. 8A is a diagram illustrating an exemplary computing device 800 with a touchscreen 810 displaying icons, in a user interface of an operating system 820, for applications that can perform contextual searching based on digital-ink data. In FIG. 8A, the user interface of the operating system 820 includes icons for applications that are installed on the computing device 800. The displayed application icons are a search engine application icon 830, a mapping application icon 832, a messaging application icon 834, an email application icon 836, a store application icon 838, and an address book application icon 840. The address book application icon 840, shown in FIG. 8A, can be used to launch the address book application 860 shown in FIG. 8B. The address book application 860 includes a search functionality that can take input search terms and search a list of address book contacts based on the search terms. In some implementations, the search terms can be associated with data in one or more data fields for one or more address book contacts of the application 860.

In FIG. 8A, digital ink 850 is generated and/or written in the touchscreen 810 based on user input such as through detected contact with the touchscreen 810 in a motion that writes the letters "Na". The operating system 820 of computing device 800 receives the digital-ink data to produce the displayed digital ink 850. The digital ink 850 is writing indicating the name "Na" in a handwriting and/or non-text format in the touchscreen 810. The digital ink 850 is displayed in the touchscreen 810 overlapping the address book application icon 840. The digital ink 850 is located within the boundary associated with the icon which is the displayed border of the address book application icon 840. In some implementations, the digital ink 850 can overlap the border of the address book application icon 840. Because the digital ink 850 overlaps the address book application icon 840, the digital ink is associated with the address book application that is launched using the address book application icon 840. The digital ink 850 is associated with the address book application to indicate that when text is determined using the digital-ink data used to produce the digital ink 850, the determined text can be sent to the associated address book application.

The digital ink 850 can be recognized as writing by a digital-ink recognition engine of the operating system 820 and the digital-ink recognition engine can determine text based on the digital ink 850. After the text is determined, the text can be sent from the operating system 820 to the address book application that can be launched by the address book application icon 840 to perform a contextual search using a search functionality of the address book application. The address book application that the text can be sent to can be launched after the digital ink 850 is rendered and/or displayed in the touchscreen 810.

Figure 8B:
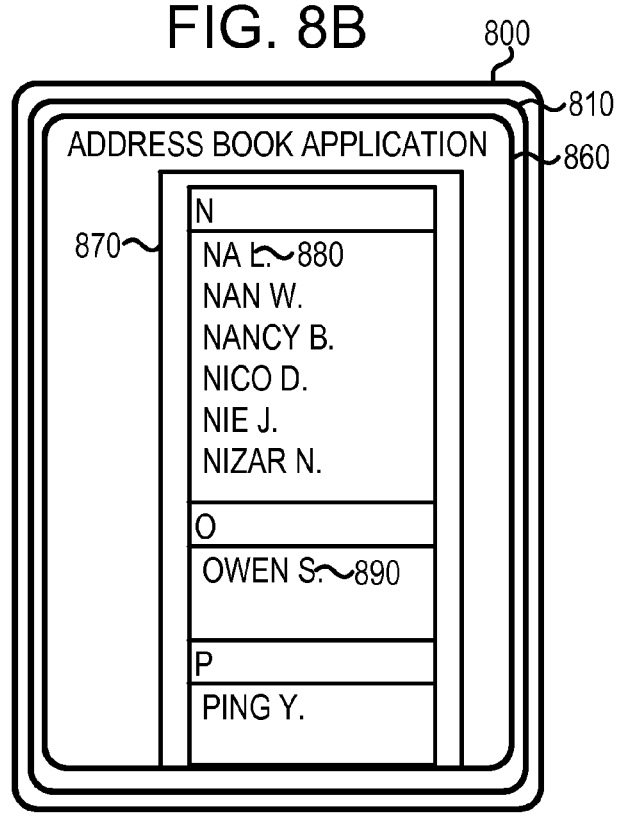
FIG. 8B is a diagram illustrating an exemplary computing device displaying a user interface of a launched address book application that can perform a contextual search based on text determined from digital-ink data.

FIG. 8B is a diagram illustrating the exemplary computing device 800 with the touchscreen 810 displaying a user interface of a launched address book application 860 that can perform a contextual search based on text determined from digital-ink data. Among other uses, the address book application 860 can be used to manage contact information related to one or more contacts of one or more users of the computing device 800. In FIG. 8B, search results 870 are displayed by the address book application 860 based on a contextual search performed using text determined from the digital ink 850 as shown in FIG. 8A. The text determined includes the letters "Na" in a text format that correspond to the name written by the digital ink 850 as shown in FIG. 8A.

The displayed search results 870 include a portion of an organized list that is managed by the address book application 860. The search results 870 include the portion of an organized list of contacts that is associated with the determined text as searched by a search functionality of the address book application 860. The search results 870 are organized based on an alphabetical order and the search results shown include the portion of the contacts list that includes the name "Na" and other contacts of the application in an alphabetical order. To produce the search results 870, the address book application 860 performs a contextual search using a contacts search functionality of the address book application 860 based on the text determined from the digital ink 850 as shown in FIG. 8A. The text that includes the letters "Na" is the search term input for the search that produced the search results shown in FIG. 8B.

Exemplary Mobile Device

Figure 9:
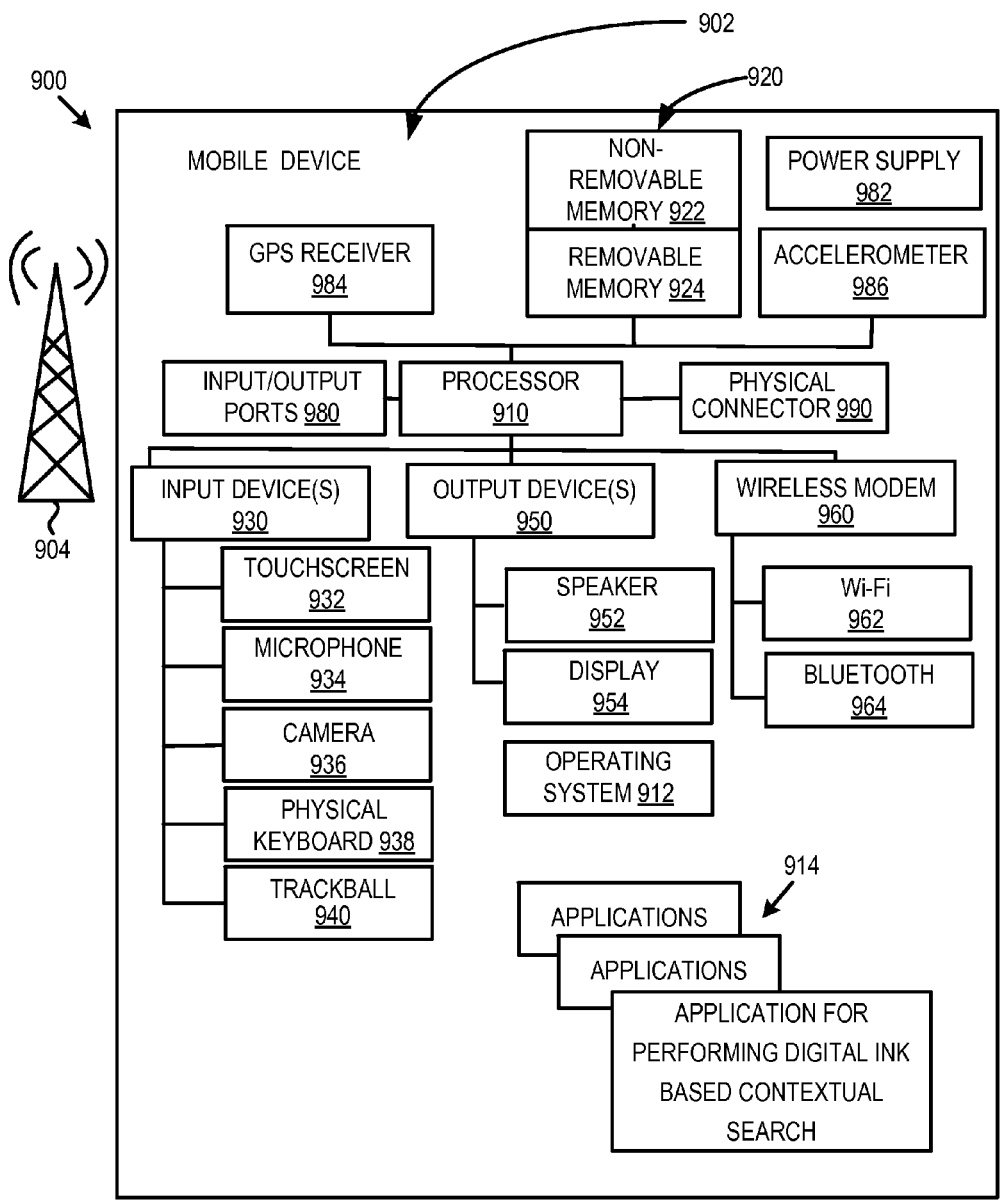
FIG. 9 is a schematic diagram depicting an exemplary mobile device with which at least some of the disclosed embodiments can be implemented.

FIG. 9 is a system diagram depicting an exemplary mobile device 900 including a variety of optional hardware and software components, shown generally at 902. In general, a component 902 in the mobile device can communicate with another component, although not all connections are shown, for ease of illustration. The mobile device can be any of a variety of computing devices (e.g., cell phone, smartphone, laptop computer, tablet computer, handheld computer, Personal Digital Assistant (PDA), etc.) and can allow wireless two-way communications with one or more mobile communications networks 904, such as a cellular or satellite network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more applications 914 that can implement one or more of the technologies described herein such as for performing a contextual search based on digital-ink data. The application programs can include common mobile computing applications and software (e.g., email applications, mapping applications, calendars, contact managers, web browsers, messaging applications, a runtime engine), or any other computing applications.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device. The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application or other application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can deleted and other components can be added.

Exemplary Implementation Environment

Figure 10:
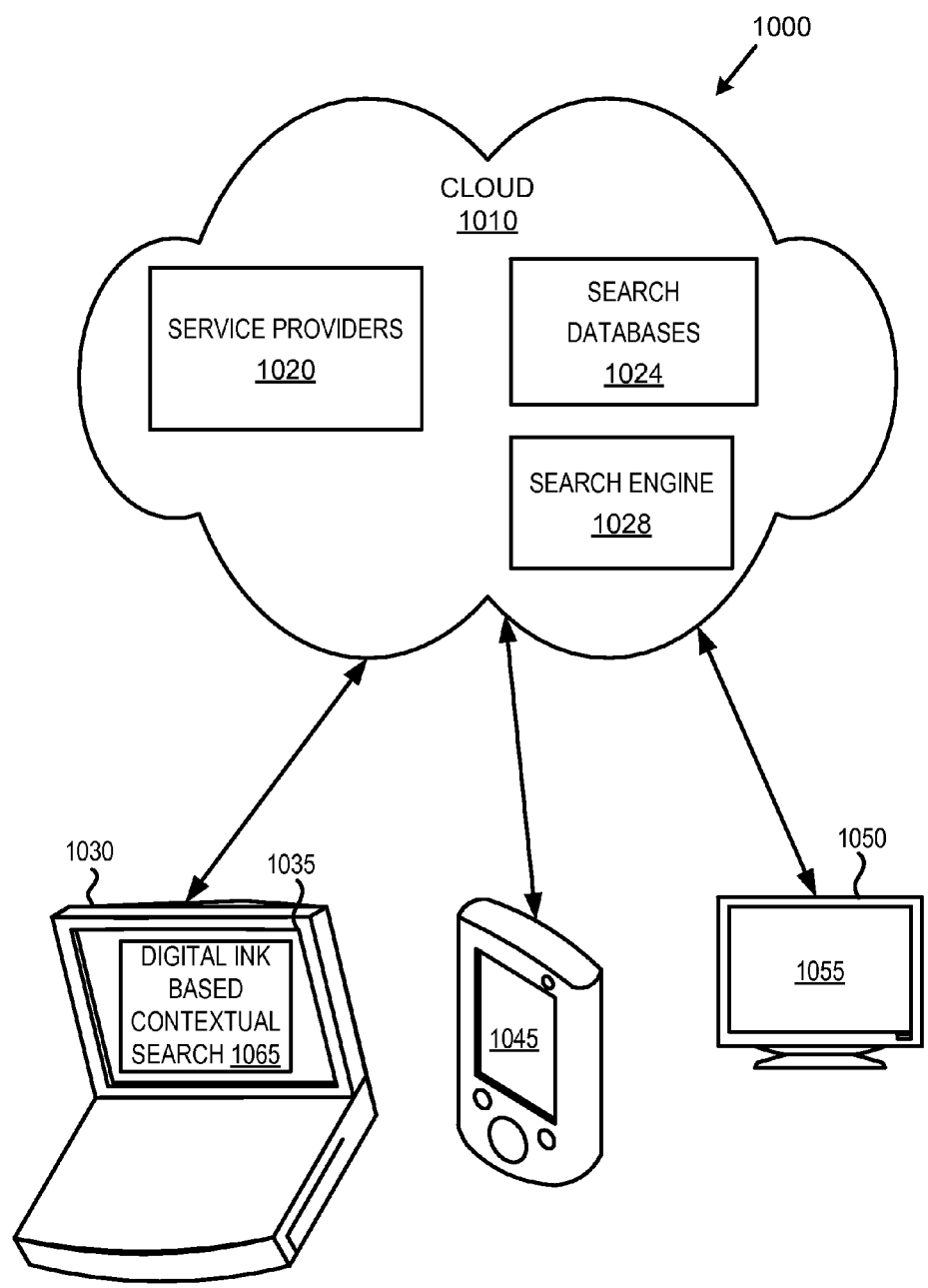
FIG. 10 is a schematic diagram illustrating a generalized example of a suitable implementation environment for at least some of the disclosed embodiments.

FIG. 10 illustrates a generalized example of a suitable implementation environment 1000 in which described embodiments, techniques, and technologies may be implemented.

In example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050) while other tasks (e.g., storage of data to be used in subsequent processing) can be performed in the cloud 1010.

In example environment 1000, the cloud 1010 provides services for connected computing devices such as connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 can be a mobile phone, smart phone, personal digital assistant, tablet computer, or the like. Connected device 1050 represents a device with a large screen 1055. For example, connected device 1050 can be a television screen (e.g., a smart television) or another device connected to a television (e.g., a set-top box or gaming console) or the like. One or more of the connected devices 1030, 1040, and 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touchscreen capability of a particular connected device (e.g., connected devices 1030, 1040, 1050).

In example environment 1000, the cloud 1010 can provide one or more of the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users). The cloud 1010 can provide one or more resources, such as one or more search databases 1024 or one or more search engines 1028, for implementing one or more of the technologies described herein such as for performing a contextual search based on digital-ink data 1065.

Exemplary Computing Environment

Figure 11:
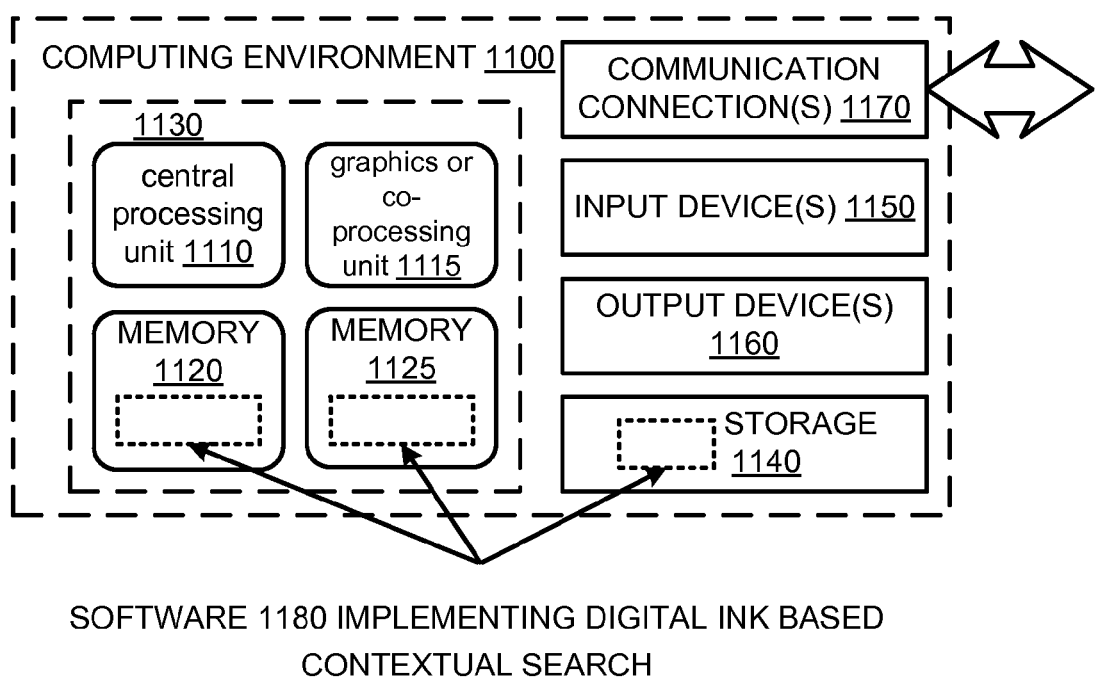
FIG. 11 is a schematic diagram illustrating a generalized example of a suitable computing environment for at least some of the disclosed embodiments.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, media player, gaming system, mobile device, etc.)

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more technologies described herein such as performing a contextual search based on digital-ink data, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, hard disks, solid-state storage such as solid state drives, or optical disks such as CD-ROMs or DVDs. The storage 1140 can store instructions for the software 1180 implementing one or more technologies described herein such as for providing contextual search based on digital-ink data.

The input device(s) 1150 may be a touch input device such as a keyboard, mouse, pen, or trackball, a voice input device, a scanning device, or another device that provides input to the computing environment 1100. For video encoding, the input device(s) 1150 may be a camera, video card, TV tuner card, or similar device that accepts video input in analog or digital form, or a CD-ROM or CD-RW that reads video samples into the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication media such as modulated data signals. Any of the computer-executable instructions for implementing the disclosed techniques as well as any data created and used during implementation of the disclosed embodiments can be stored on one or more computer-readable media (e.g., computer-readable storage media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, C#, J++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionally described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A method comprising:
   at a computing device, receiving digital-ink data on a user interface including multiple icons associated with applications available for launch on the computing device, the received digital-ink data overlapping with only a first icon of the multiple icons;
   associating the digital-ink data with the first icon for which the digital-ink data overlaps;
   determining text based on the digital-ink data;
   launching an application associated with the first icon; and
   using the launched application, performing a contextual search using the text.

2. The method of claim 1, further comprising, after receiving the digital-ink data, committing the digital-ink data.

3. The method of claim 2, wherein the determining the text is responsive to the committing the digital-ink data.

4. The method of claim 1, wherein the receiving the digital-ink data comprises determining one or more locations of contact with a touchscreen of the device; and
   wherein the method further comprises rendering digital ink, in the touchscreen, at the one or more locations of contact.

5. The method of claim 1, wherein the first icon comprises an application dynamic icon.

6. The method of claim 1, wherein the determining the text based on the digital-ink data comprises:
   recognizing the digital-ink data; and
   translating the recognized digital-ink data into the text.

7. The method of claim 1, further comprising sending the text to the application using an application programming interface.

8. The method of claim 1, wherein the contextual search is performed automatically responsive to the application receiving the text.

9. The method of claim 1, wherein the contextual search provides results based on the text.

10. A computing device comprising a processor and computer-readable storage media, the computer-readable storage media storing computer-executable instructions for causing the computing device to perform a method, the method comprising:
    receiving digital-ink data overlapping only a first icon of multiple application icons;
    associating the first icon with the digital-ink data as a result of the overlapping;
    determining text based on the digital-ink data;
    launching an application associated with the first icon and sending the text to the application; and
    by the application, performing a contextual search using the text.

11. The computing device of claim 10, wherein the contextual search, by the application, provides results based on the text.

12. One or more computer-readable storage media storing computer-executable instructions for causing a computing device to perform a method, the method comprising:
    receiving digital-ink data associated with an application, the receiving the digital-ink data comprises determining one or more locations of contact with a touchscreen of the computing device such that the one or more locations of contact overlap with only a first icon of multiple icons, the first icon being associated with the application;
    committing the received digital-ink data;
    responsive to the committing the received digital-ink data, determining text at least by recognizing the digital-ink data;
    associating the digital-ink data with the application due to the overlap and automatically launching the application after the received digital-ink data is committed;
    sending the determined text to the application that is launched on the computing device;
    by the application, automatically performing a contextual search using the text as search term input; and
    by the application, providing results for the contextual search based on the search term input.

* * * * *